US011363051B2

(12) United States Patent
Izrael et al.

(10) Patent No.: US 11,363,051 B2
(45) Date of Patent: Jun. 14, 2022

(54) SYSTEM AND METHOD FOR MITIGATING CYBER SECURITY THREATS BY DEVICES USING RISK FACTORS

(71) Applicant: Armis Security Ltd., Tel Aviv-Jaffa (IL)

(72) Inventors: Nadir Izrael, Mountain View, CA (US); Shiri Ladelsky Lellouch, Menlo Park, CA (US); Misha Seltzer, Toronto (CA)

(73) Assignee: Armis Security Ltd., Tel Aviv-Jaffa (IL)

(*) Notice: Subject to any disclaimer, the term of this patent is extended or adjusted under 35 U.S.C. 154(b) by 77 days.

(21) Appl. No.: 16/371,794

(22) Filed: Apr. 1, 2019

(65) Prior Publication Data

US 2020/0314134 A1 Oct. 1, 2020

(51) Int. Cl.

| | |
|---|---|
| ***G08B 23/00*** | (2006.01) |
| ***G06F 12/16*** | (2006.01) |
| ***G06F 12/14*** | (2006.01) |
| ***G06F 11/00*** | (2006.01) |
| ***H04L 9/40*** | (2022.01) |
| ***G06F 21/55*** | (2013.01) |

(52) U.S. Cl.

CPC ........ *H04L 63/1433* (2013.01); *G06F 21/552* (2013.01); *G06F 21/554* (2013.01); *G06F 2221/034* (2013.01)

(58) Field of Classification Search

CPC . H04L 63/1433; G06F 21/552; G06F 21/554; G06F 2221/034

USPC .......................................................... 726/25

See application file for complete search history.

(56) References Cited

U.S. PATENT DOCUMENTS

| | | | | |
|---|---|---|---|---|
| 9,600,320 | B2* | 3/2017 | Hamilton, II | H04L 63/1433 |
| 9,894,093 | B2* | 2/2018 | Maestas | G06F 21/577 |
| 10,095,866 | B2* | 10/2018 | Gong | H04L 63/1416 |
| 10,333,965 | B2* | 6/2019 | Gathala | H04W 12/1208 |
| 10,699,018 | B2* | 6/2020 | Hamby | G06F 21/577 |
| 10,708,291 | B2* | 7/2020 | Findlay | H04L 63/20 |
| 10,735,456 | B2* | 8/2020 | Crabtree | H04L 63/1441 |
| 2013/0246088 | A1* | 9/2013 | Huster | G16H 20/40 705/2 |
| 2015/0067865 | A1* | 3/2015 | Seacat Deluca | G06F 21/554 726/25 |
| 2015/0163242 | A1 | 6/2015 | Laidlaw et al. | |
| 2016/0226911 | A1* | 8/2016 | Boss | H04L 63/1433 |

(Continued)

OTHER PUBLICATIONS

Anil Lamba; Mitigating Cyber Security Threats of Industrial Control Systems (SCADA & DCS); International Journal for Technological Research in Engineering; Year:2017; pp. 31-34.*

(Continued)

*Primary Examiner* — Monjur Rahim
(74) *Attorney, Agent, or Firm* — M&B IP Analysts, LLC

(57) ABSTRACT

A system and method for mitigating cyber security threats by devices using risk factors. The method includes determining a plurality of risk factors for a device based on a plurality of risk behaviors indicated by network activity and information of the device; determining a risk score for the device based on the plurality of risk factors and a plurality of weights, wherein each of the plurality of weights is applied to one of the plurality of risk factors; and performing at least one mitigation action based on the risk score.

21 Claims, 3 Drawing Sheets

(56) References Cited

U.S. PATENT DOCUMENTS

| | | | | |
|---|---|---|---|---|
| 2017/0214701 | A1 | 7/2017 | Hasan | |
| 2017/0264644 | A1* | 9/2017 | Mihan | H04W 4/70 |
| 2018/0124091 | A1* | 5/2018 | Sweeney | G06F 16/2228 |
| 2018/0247312 | A1* | 8/2018 | Loganathan | H04L 63/0876 |

OTHER PUBLICATIONS

The International Search Report and The Written Opinion for PCT/US2929/023557, dated Jun. 4, 2020, ISA/RU, Moscow, Russia.

* cited by examiner

SYSTEM AND METHOD FOR MITIGATING CYBER SECURITY THREATS BY DEVICES USING RISK FACTORS

TECHNICAL FIELD

The present disclosure relates generally to cyber security, and more particularly to securing networks against threats posed by malicious devices.

BACKGROUND

Whenever a new device connects to a network of an organization or is activated in a location that is proximate to the organization's physical location, there is a possibility that the new device could be used by a malicious entity to cause harm to the organization, the network, or both. The number of potential problems that may occur due to network access has increased exponentially due to the rapidly increasing number of new devices that are now capable of network connectivity. Further, many of these new devices are not only capable of connecting to networks but may also be able to create their own networks or hotspots.

Some solutions for securing organizations' computing infrastructures against malicious devices include requiring authentication for new devices logging onto the network and blocking unknown devices from accessing the network. However, requiring authentication does not necessarily prevent a malicious entity from obtaining the necessary credentials and accessing the network despite the authentication protocols. Also, blocking all unknown devices may result in benign devices being blocked. Moreover, previously benign devices may become malicious when, for example, infected by malware. Thus, such malware-infected devices may be allowed network access that may be utilized for malicious purposes.

Other solutions for securing organizations' computing infrastructures include monitoring network activity to detect anomalies. However, existing detection tools may not detect certain types of anomalous behavior, for example a new attack pattern used as part of a zero-day attack that is not yet recognized by the detection tools. Additionally, devices that do not pose a direct threat to the network (e.g., devices that are not directly engaging in malicious behavior but provide network access to other malicious devices) may not be detected as malicious or may take longer to detect as malicious than devices engaging in more easily recognizable malicious activity.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for mitigating cyber security threats by devices using risk factors. The method comprises: determining a plurality of risk factors for a device based on a plurality of risk behaviors indicated by network activity and information of the device; determining a risk score for the device based on the plurality of risk factors and a plurality of weights, wherein each of the plurality of weights is applied to one of the plurality of risk factors; and performing at least one mitigation action based on the risk score.

Certain embodiments disclosed herein also include a non-transitory computer readable medium having stored thereon causing a processing circuitry to execute a process, the process comprising: determining a plurality of risk factors for a device based on a plurality of risk behaviors indicated by network activity and information of the device; determining a risk score for the device based on the plurality of risk factors and a plurality of weights, wherein each of the plurality of weights is applied to one of the plurality of risk factors; and performing at least one mitigation action based on the risk score.

Certain embodiments disclosed herein also include a system for mitigating cyber security threats by devices using risk factors. The system comprises: a processing circuitry; and a memory, the memory containing instructions that, when executed by the processing circuitry, configure the system to: determine a plurality of risk factors for a device based on a plurality of risk behaviors indicated by network activity and information of the device; determine a risk score for the device based on the plurality of risk factors and a plurality of weights, wherein each of the plurality of weights is applied to one of the plurality of risk factors; and perform at least one mitigation action based on the risk score.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
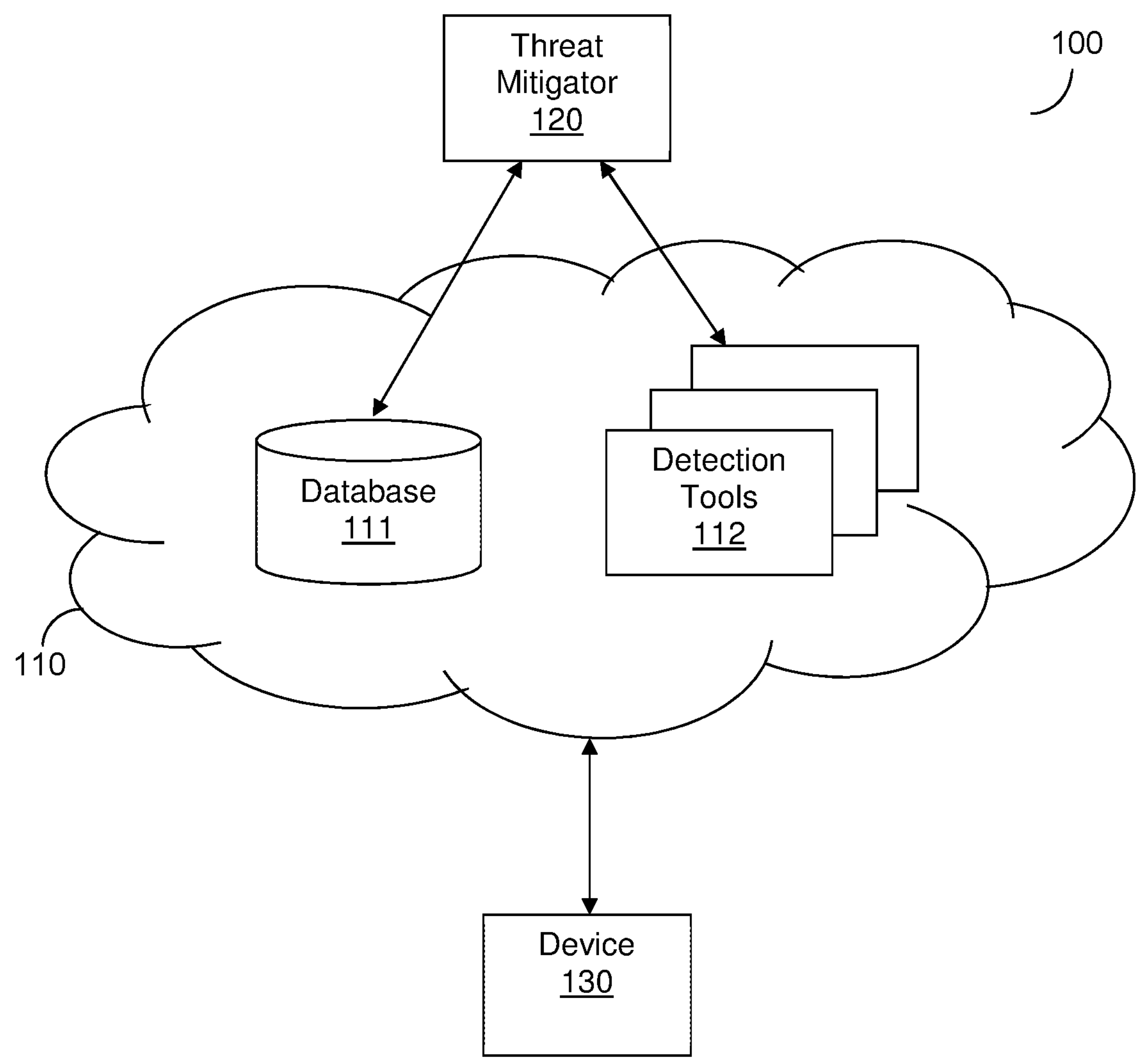
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that, whenever a device connects to a network or is turned on in physical proximity to network infrastructure, the new device should be quickly assessed to determine whether and to what extent the new device poses a threat to the organization. Reaction to any malicious entities must be rapid since more damage can be inflicted the longer a malicious device has access to the network. Moreover, devices should be continuously assessed to ensure that changes in activity or combinations of actions do not demonstrate a potential threat.

However, assessment of potential threats should be flexible such that activity which may not present a direct, known cybersecurity threat can be detected. For example, a printer connected to a network may act as a backdoor by broadcasting an unprotected Wi-Fi signal. The printer itself may not present any cyber threats that would be detected by cyber threat detection tools but may allow access to the network by other malicious devices. As another example, a smart television that does not have appropriate antivirus software or a smartphone with out-of-date software may present cyber security threats even when the device itself has not yet started acting maliciously.

The disclosed embodiments allow for rapid detection and mitigation of potential cyber security threats by devices. Risk factors used according to the disclosed embodiments provide a more flexible approach to detecting potentially malicious devices than existing solutions while maintaining fast reaction times. In particular, the risk factors allow for detecting potentially malicious devices in cases such as, but not limited to, devices engaging in cyber-attacks that are not yet known to the detecting system, devices engaged in pre-attack phase (e.g., exploration, infection, or dormant stages) activities, devices that do not directly present risks (e.g., devices providing backdoor network access to other devices or devices that may be susceptible to exploits by other devices and systems), and completely unknown devices for which no activity data is yet available.

To this end, the various disclosed embodiments include a method and system for mitigating cyber security threats by devices using risk factors. A device to be checked for risk is detected. The detected device may be a device that is connected to a network, a device that is physically proximate to network infrastructure (e.g., to a router), or a device that is otherwise visible to a network.

Risk factors are determined for the device based on risk-related behaviors (hereinafter "risk behaviors"). Each risk factor is determined based on one or more observed risk behaviors, one or more assumed risk behaviors, or a combination thereof. The observed risk behaviors are behaviors indicated by data gathered from the device (e.g., device configuration data, protocol data, signal strength data, etc.), indicated by data gathered with respect to activity by the device on the network, or both. The assumed risk behaviors are extrapolated based on contextual data related to the device such as other devices that have accessed the network, public information (e.g., information about a company that manufactures or designs the device, information related to software installed on the device, etc.), entropy of data in traffic to or from the device, or a combination thereof.

Based on the risk factors, a risk score is determined for the device. The risk score may be a weighted average of the determined risk factors. The weight applied to each of the risk factors may be predetermined and may further vary based on portions of the network being accessed, a type of device, the specific device, and the like.

Based on the risk score, one or more mitigation actions are performed. In an example implementation, the mitigation actions include actively interfering with the device connecting to or acting on the network when the risk score is above a threshold and passively monitoring activity by the device when the risk score is below a threshold.

Some of the risk factors may be weighted negatively such that the negative risk factors reduce the risk score for the device. For example, the presence of antivirus software installed on the device may result in a negative weight applied to a risk factor for cybersecurity software installed on the device. The negative risk factors allow for a more holistic view of risk as compared to some existing solutions that determine devices to be either safe or not safe when certain conditions are met.

The disclosed embodiments include determining risk factors based on risk behaviors. Following is an explanation of how certain types of risk behaviors are used to determine various risk factors and examples of specific risk behaviors may affect the resulting risk factors.

Various of the following examples mention high numbers. A number may be high for purposes of a risk factor if, for example, the number is above a threshold. The threshold may be changed over time, for example as normal device activity changes. Various of the following examples also mention more, higher, older, or other relative statements. For such examples, the value of the risk factor may increase as the respective number or degree increases.

An attack surface exposure risk factor may be determined based on risk behaviors such as, but not limited to, vulnerabilities, common traffic patterns, threat intelligence, vulnerabilities to traffic, open ports, use of specific protocols, access of cloud domains, wireless protocols, open hotspots, and any other external access provided by a device. Risk behaviors that would result in a higher attack surface exposure risk factor may include, but are not limited to, a high number of open ports, wireless communications, hotspots, or combinations thereof; use of unencrypted protocols; traffic patterns that deviate from the common traffic patterns; threat intelligence for the device indicating that the device likely presents a cyber security threat; and a high number of known vulnerabilities.

A cloud synchronization risk factor may be determined based on risk behaviors for the device with respect to cloud services accessed by the device such as, but not limited to, a number of cloud services used by the device, an amount of data transmitted by the device to cloud services, a number of tunnels formed between the device and cloud environments, types of data transmitted by the device, known reputations of domains of cloud environments accessed by the device, and the like. Risk behaviors that would result in a higher cloud synchronization risk factor may include, but are not limited to, a high number of cloud endpoints, unencrypted data or credentials, accessing suspicious cloud domains, and the like.

A connection security risk factor may be determined based on risk behaviors for the device with respect to security and potential vulnerabilities of connections by the device such as, but not limited to, vulnerabilities and threat intelligence related to protocols used by the device as well as connections data (e.g., numbers of other distinct devices to which the device is connected, whether connections are encrypted, etc.). Risk behaviors that would result in a higher connection security risk factor may include, but are not limited to, a high number of connections to distinct devices, use of unencrypted connections, use of known potentially vulnerable protocols, and the like.

A boundary evasion risk factor may be determined based on risk behaviors for the device with respect to the device connecting to multiple trusted boundaries such as, but not limited to, a number of connections to distinct boundaries, a number of connections to sensitive boundaries (e.g., boundaries of corporate networks), known standard device configurations, and the like. Risk behaviors that would result in a higher boundary evasion risk factor may include, but are not limited to, more connections to distinct boundaries, more connections to sensitive boundaries, a device connecting to more than one network when standard device configurations for similar devices suggest that the device shouldn't connect to more than one network, and the like.

A third party application stores risk factor may be determined based on risk behaviors for the device with respect to the number and risk of third party application stores accessed by the device such as, but not limited to, number of third party application stores accessed, reputations of domains hosting third party application stores accessed, security features (e.g., firewalls, traffic blocks, etc.) of accessed third party application stores, and the like. Risk behaviors that would result in a higher third party application stores risk factor may include, but are not limited to, more third party application stores accessed, higher risk remote domains as indicated by threat intelligence with respect to known attacks, a lack of detected firewalls or traffic blocks, and the like.

A malicious domains risk factor may be determined based on risk behaviors for the device with respect to the number and risk of domains accessed by the device such as, but not limited to, a number of known malicious or suspicious domains accessed, higher risk remote domains as indicated by threat intelligence with respect to known attacks, security features (e.g., firewalls, traffic blocks, etc.) of accessed domains, and the like. Risk behaviors that would result in a higher malicious domains risk factor may include, but are not limited to, more connections to known malicious or suspicious domains, higher risk remote domains as indicated by threat intelligence with respect to known attacks, a lack of detected firewalls or traffic blocks, and the like.

A vulnerability history risk factor may be determined based on risk behaviors for the device with respect to the number and severity of vulnerabilities detected for the device such as, but not limited to, number of detected vulnerabilities, severity of vulnerabilities, whether vulnerabilities are remotely exploitable, whether mitigations have been performed by the device, and the like. Risk behaviors that would result in a higher vulnerability history risk factor may include, but are not limited to, more vulnerabilities, higher risk vulnerabilities, higher risk remotely exploitable vulnerabilities, lack of mitigations, and the like.

A data-at-rest risk factor may be determined based on risk behaviors for the device with respect to hoarding or storing data by the device such as, but not limited to, amounts of data sent to and received by the device, importance or sensitivity of data sent to the device, whether the device has an encrypted disk, and the like. Risk behaviors that would result in a higher data-at-rest risk factor may include, but are not limited to, more data going into the device than coming out, more important or sensitive traffic going to the device, the device lacking an unencrypted disk, and the like. Example important or sensitive data may include, but are not limited to, customer relationship management data, device data, scan data, patient data, data indicating personally identifiable information, and the like.

An external connectivity risk factor may be determined based on risk behaviors for the device with respect to opening of external connections by the device such as, but not limited to, number of hotspots, number of open wireless protocols, whether access by the device is encrypted, whether access by the device requires authentication, known vulnerabilities of any external connections, and the like. Risk behaviors that would result in a higher external connectivity risk factor may include, but are not limited to, more hotspots, more open wireless protocols, unencrypted access, unauthenticated access, known vulnerabilities for external connections, and the like.

A user authentication risk factor may be determined based on risk behaviors for the device with respect to distinct user authentications on the device and security of credentials for those user authentications such as, but not limited to, number of users using the same device, whether credentials are encrypted, whether authenticating users conform to a known organizational structure, and the like. Risk behaviors that would result in a higher user authentication risk factor may include, but are not limited to, more users using the same device, unencrypted credentials, users that do not conform to the structure of users in the organization, and the like.

A software version risk factor may be determined based on risk behaviors for the device with respect to the number and age of operating systems and software applications installed on the device such as, but not limited to, age of applications, age of operating systems, number of applications, number of operating systems, version numbers of applications, version numbers of operating systems, applications or operating systems having known higher risk remotely exploitable vulnerabilities, lack of mitigations of cyber threats by operating systems or software, and the like. Risk behaviors that would result in a higher software version risk factor may include, but are not limited to, older applications or operating systems, more applications or operating systems, applications or operating systems having higher risk remotely exploitable vulnerabilities, lack of detected mitigations, and the like.

A certificate reuse risk factor may be determined based on risk behaviors for the device with respect to reuse of certificates by the device such as, but not limited to, a number of devices using the same certificate, whether certificates used by the device are user based or device based, makes and models of devices sharing the certificate, and the like. Risk behaviors that would result in a higher certificate reuse risk factor may include, but are not limited to, more devices using the same certificate, use of user based certificates, sharing of a certificate by devices having different makes and models, and the like.

A manufacturer reputation risk factor may be determined based on risk behaviors related to the manufacturer of the device such as, but not limited to, a number of known breaches affecting the manufacturer, known reputations of geographical locations of origin for the manufacturer, a known number of vulnerabilities across devices made by the manufacturer, and the like. Risk behaviors that would result in a higher manufacturer reputation risk factor may include, but are not limited to, higher numbers of known breaches affecting the manufacturer, poor reputation of country of origin, higher number of vulnerabilities of devices made by the manufacturer, and the like.

A device model reputation risk factor may be determined based on risk behaviors related to the model of the device such as, but not limited to, a degree of commonality of the device model (e.g., a relative number of users or owners of the devices having the same model), known threat intelligence for the model of the device, number of known vulnerabilities for the device model, and the like. Risk behaviors that would result in a higher device model reputation risk factor may include, but are not limited to, the device model being less common, threat intelligence on the device model suggesting that the device model is likely unsafe, a high number of vulnerabilities for the device model, and the like.

FIG. 1 shows an example network diagram 100 utilized to describe the various disclosed embodiments. In the example network diagram 100, a threat mitigator 120 is deployed such that it can access a network 110. The network 110 may be, but is not limited to, a wireless, cellular or wired network, a local area network (LAN), a wide area network (WAN), a metro area network (MAN), similar networks, and any combinations thereof.

A device 130 accesses (shown) or is deployed in physical proximity (not shown) to the network 110. The device 130 may be, but is not limited to, a personal computer, a laptop, a tablet computer, a smartphone, a wearable computing device, a printer, or any other device connected to the network 110 or deployed in physical proximity to network infrastructure (e.g., a router, not shown) of the network 110.

In an example implementation, the network 110 includes a database 111 and one or more network activity detection tools 112. The threat mitigator 120 is configured to access the database 111, the detection tools 112, or both, to obtain data related to risk behaviors to be used for determining risk factors.

The database 111 may store contextual data related to assumed risk behaviors such as, but not limited to, manufacturer reputation information, device model reputation information, number of common vulnerabilities and exposures associated with products by the manufacturer or designer, number of employees of the manufacturer or designer, popular operating systems, and the like. The database 111 may also store data collected by the network activity detection tools 112 such that the threat mitigator 112 may retrieve such information from the database 111.

The database 111 may further store data related to known device behaviors that may be utilized to determine risk factors. Thus, the database 111 may act as a knowledgebase of known device behavior profiles. The data related to known device behaviors may define baseline behaviors for a device representing normal behavior and values (or formulas used for calculating values) of risk factors based on deviations from the baseline behaviors. As a non-limiting example, a baseline behavior for a security camera may be communicating with a single internal server on the network at a fixed geographical location. Risk factors for the security camera may be defined for behaviors including communicating with more than one server, communicating with an external server, ceasing communications with the server, or changing geographic location.

The manufacturer reputation information may include information related to previous devices connected to the network, public source information related to the size and notable security breaches for the company, or both. The information related to previous devices may be based on risk scores determined for other devices having the same manufacturer such that high risk scores of such previous devices will increase the resulting risk factor. The size and security breach information may include, for example, a number of CVEs, a severity of each CVE, and a size of the company such that a high number of CVEs and high severity of CVEs relative to the number of employees of the company will result in a higher risk factor.

The popular operating systems information may include common operating systems seen installed on other devices, minimum and maximum (i.e., earliest and latest or least secure and most secure) operating system versions available for a device, or both. Devices that do not use common operating systems result in higher risk factors. Devices having operating system versions closer to the minimum version result in higher risk factors than devices having operating system versions closest to the maximum.

The detection tools 112 are configured to collect data related to the device, network activity by the device 130, or both. Such data may include data related to observed risk behaviors such as, but is not limited to, data included in traffic to or from the device 130, amounts of traffic sent by the device 130, number of endpoints receiving traffic from the device 130, type of traffic sent by the device 130 (e.g., encrypted or unencrypted, repetitive or non-repeating, etc.) common vulnerabilities and exposure exhibited by the device 130 (e.g., for the device 130, for software running on the device 130, or both), domains and Internet Protocol (IP) addressed accessed by the device 130, types and versions of software installed on the device 130, type and version of an operating system installed on the device 130, amount and type of external communication options (e.g., ports, protocols, amount of service set identifiers broadcasted, amount of different antennae, etc.), geographical location of the device, geographical movements of the device, and the like. The network activity data may be collected with respect to the device 130, an operating system running on the device 130, for each application running on the device 130, or a combination thereof.

The threat mitigator 120 is configured to determine a risk score for the device 130 and to perform mitigation actions based on the determined risk score. The risk score is determined based on risk factors. The risk factors are determined based on risk behaviors including observed risk behaviors and assumed risk behaviors. The observed risk behaviors may be indicated in data collected from the device 130, from the network activity detection tools 112 with respect to network activity by the device 130, or both. The assumed risk behaviors are extrapolated based on contextual data related to the device such as, but not limited to, activity by other devices (not shown) accessing the network 110, public information related to the device (e.g., information about a manufacturer of the device, an assumed operating system used by the device 130, data transmitted to or by the device, etc.), or both. Each risk factor may be determined based on observed risk behaviors, assumed risk behaviors, or a combination thereof.

It should be noted that the disclosed embodiments are not limited to the particular layout shown in FIG. 1. For example, the threat mitigator 120 is illustrated in FIG. 1 as being deployed outside the network 110, but that the threat mitigator 120 may be equally deployed in the network 110 without departing from the scope of the disclosure. Additionally, the threat mitigator 120 and the detection tools 112 are shown separately for simplicity purposes, but that the threat mitigator 120 may be included in one of the detection tools 112 or otherwise act as one of the detection tools 112 without departing from the scope of the disclosure.

Figure 2:
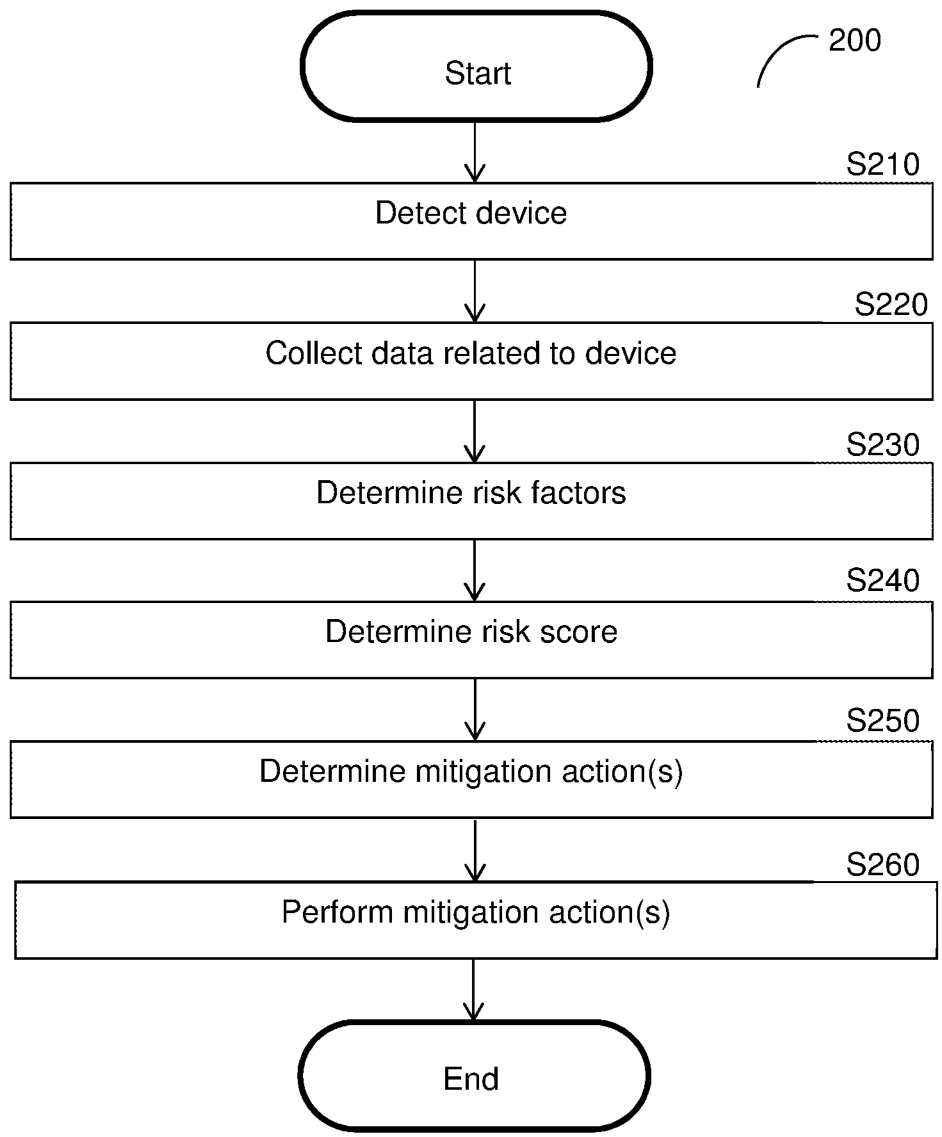
FIG. 2 is a flowchart illustrating a method for mitigating cyber security threats by devices using risk factors according to an embodiment.

FIG. 2 is an example flowchart 200 illustrating a method for mitigating cyber security threats by devices using risk factors according to an embodiment. In an embodiment, the method is performed by the threat mitigator 120.

At optional S210, a device to be checked for risk is detected. The detection may include detecting a connection of a device to a network, detection of a device turning on in physical proximity to network infrastructure, or detection of a device otherwise becoming visible to the network (e.g., a device that is already turned on moving within a threshold physical distance from any part of the network infrastructure). In some implementations, a device that was already visible to the network may be checked for risk. In particular, a device may be continuously analyzed as described with respect to the following steps from connection to disconnection from the network.

At S220, data related to the device is collected. The data related to the device includes data directly related to the device (e.g., configuration data of the device, identifying information of the device, etc.) and network activity by the device (e.g., data collected from the device or gathered by monitoring activity of the device) and data indicating contextual information related to the device.

The collected data may include, but is not limited to, network activity data (e.g., data indicating traffic coming into or out of the device, traffic data (i.e., data transmitted by or to the device), volume of traffic, portions of the network to which the device has connected, etc.), identifying information of the device (e.g., a name, model number, identifier, a manufacturer of the device, etc.), end-of-life or end-of-service-life data, software data related to the device (e.g., programs installed on the device), connection data (e.g., open ports, wireless communications, hotspots, number of networks the device is connected to as an endpoint, whether connections are encrypted, domains and Internet protocol addresses of systems to which the device is connected, etc.), protocol data indicating protocols used by the device, websites visited by the device, geolocation of the device, type of the device (e.g., smartphone, smartwatch, laptop, security camera, personal computer, etc.), data indicating other information related to determining risk factors as described above, and the like.

At S230, based on the collected data, risk factors are determined. The risk factors are determined based on risk behaviors such as observed risk behaviors and assumed risk behaviors. In an embodiment, each risk factor is determined based on a list of predetermined risk factors and associated risk behaviors, as a function of one or more numerical values representing risk behaviors, or a combination thereof (e.g., a predetermined numerical value may be associated with an associated risk behavior, and the predetermined numerical value may be used as an input to a function of multiple risk behavior values). In an example implementation, each risk factor is a number in the range of 1-10.

Each risk factor may be determined based on observed risk behaviors, assumed risk behaviors, or a combination thereof, and may be aggregated based on multiple values representing different risk behaviors. To this end, S230 may further include determining a value for each risk behavior and aggregating the values to determine a risk factor.

In an embodiment, the risk factors may be determined based on a knowledgebase of known normal device behaviors. Such a knowledgebase may be stored in a database (e.g., the database 111, FIG. 1) and includes known normal behaviors of devices. The knowledgebase further defines risk factors for deviations from the known normal behaviors. To this end, the knowledgebase may define predetermined values for particular deviating behaviors, formulas for calculating values of risk factors based on values representing deviations from normal behavior, or both. The known normal behaviors may further include different sets of known normal behaviors for different devices, types of devices, users of devices, and the like.

In another embodiment, the risk factors may be determined based on comparison of behaviors between devices. For example, behaviors of the device may be compared to behaviors of other devices that are connected to the network. More specifically, a risk factor determined for a device based on comparison to other devices on the network may be determined based on whether there is a difference in behavior, a degree of difference in behavior, a number of other devices having the same behavior, a number of other devices having different behavior, numbers of devices having different degrees of difference in behavior, and the like.

The comparison may further be between comparable devices, types of devices (e.g., behaviors of laptops may be compared to each other but not to behaviors of servers or security cameras), owners of devices (e.g., behaviors of devices may be compared among entry level employees, between management, between executives or other high-ranking officials, etc.), brands of devices, and the like. As a non-limiting example, if other ABC brand laptop computers on the network have an operating system version 10.1 and the device is a laptop on the network having an operating system version 9.0, a risk factor may be determined based on this deviation.

Some examples for determining risk factors follow. First, data indicating that the device is moving is associated with a predetermined observed behavior risk factor of 2 and data indicating that the device is immobile is associated with a predetermined observed behavior risk factor of 8. Second, the assumed behavior risk factor for company common vulnerabilities and exposure (CVE) history is determined as a function of the quotient (Number of CVEs)/(Number of Employees) such that a higher number of CVEs relative to the size of the company expressed in number of employees yields a higher risk factor, and the function may further be based on the severity of each of the CVEs. Third, the assumed risk behavior for data predictability may be a function of entropy calculated based on the data such that higher entropy results in a lower risk factor and vice versa. Fourth, connections to a suspicious cloud domain (e.g., from a predetermined list of suspicious cloud domains) may be associated with a value of 7 and connections to 20 cloud endpoints may be associated with a value of 9 such that the aggregated risk factor is determined to be 8.

Additional example risk factors and the risk behaviors they are determined based on are described above.

In an embodiment, S230 further includes determining the observed risk behaviors. The observed risk behaviors are determined directly based on network activity data, configuration data, or both, of the device. As a non-limiting example, network activity data related to traffic may be analyzed to determine an amount of traffic into and out of the device. As another non-limiting example, configuration data for the device may be analyzed to determine whether the device has an encrypted disk.

In an embodiment, S230 further includes determining the assumed risk behaviors. The assumed risk behaviors are determined indirectly by extrapolating based on contextual information related to the device. To this end, the contextual information may include, for example, predetermined associations between certain circumstances indicated by data related to the device and assumed risk behaviors. The circumstances may be determined based on data related to the device such as, but not limited to, configuration data for the device, identifying data for the device (e.g., identifying the device by name, type, model, manufacturer, brand, etc.). As a non-limiting example, configuration data for the device may be analyzed to determine an operating system version of the device (e.g., ABC OS v0.5.4), and a known age of the operating system (e.g., an actual age or an age relative to other versions) may be determined based on a list of known versions of the operating system. As another non-limiting example, identifying data for the device may be analyzed to determine a manufacturer of the device (e.g., XYZ Phone Manufacturers, Inc.), and a manufacturer reputation for the device may be determined based on a list of manufacturers and known reputations (e.g., reputations expressed as the number of common vulnerabilities and exposures attributed to the manufacturer relative to the number of employees of the manufacturer).

At S240, based on the risk factors, a risk score is determined for the device. In an embodiment, the risk score is determined by applying a weight value to each risk factor. The risk score is the sum of the weighted risk factors. The weights may be predetermined and may further differ depending on the device (e.g., a type of device, a model, a specific device, etc.), activity by the device (e.g., portions of the network to which the device connects), or both. As a non-limiting example, a low weight of 0.1 may be applied to a risk factor for the number of domains accessed when the device is a laptop, while a higher weight of 0.8 may be applied to that risk factor when the device is a security camera.

In some implementations, at least some of the weights may be negative such that their corresponding risk factors reduce the overall risk score. This allows for holistic consideration of aggravating and mitigating circumstances related to risk (i.e., circumstances that increase the likelihood that a device is risky and decrease the likelihood that a device is risky, respectively).

At S250, based on the risk score, appropriate mitigation actions are determined. The appropriate mitigation actions may include, but are not limited to, disconnecting the device from the network, preventing the device from connecting to the network (e.g., by reconfiguring access control settings of network infrastructure), limiting activity by the device on the network (e.g., preventing the device from uploading data to the network), limiting portions of the network to which the device can connect (e.g., only allowing the device to connect to a guest network rather than a private network), and the like. Which mitigation actions to perform may vary, for example, based on one or more thresholds for the risk score.

In some implementations, the appropriate mitigation actions may include passive monitoring of activity by the device instead of active interference with device activity, for example, when the risk score is below a threshold. In such implementations, the risk factors and risk score for the device may be updated over time (e.g., periodically) based on new information gained through the passive monitoring. This allows for providing network access to devices which have not yet been determined as sufficiently risky to mitigate and reevaluating the risk posed by the device based on network activity. For example, a device that has not yet been connected to the network for a long period of time may have a low risk score initially, but the device may have a higher risk score over time as the device acts within the network. Thus, such a device may be initially permitted to act but may be disconnected or otherwise prevented from accessing the network once it is determined that the device presents a likely cyber security threat.

At S260, the mitigation actions are performed. In some implementations, the risk factors and risk score for the device may be updated periodically, when suspicious activity is detected (for example, by one or more cybersecurity detection tools such as the detection tools 112, FIG. 1), or both. In such implementations (not shown), execution continues with S220.

It should be noted that FIG. 2 is described with respect to a discrete single assessment of a device with respect to risk factors merely for simplicity and without limitation on the disclosed embodiments. The disclosed embodiments may be equally applied to implementations in which the assessment of the device is performed repeatedly, is performed continuously, or is otherwise updated throughout a session of the device on or in physical proximity to the network.

Figure 3:
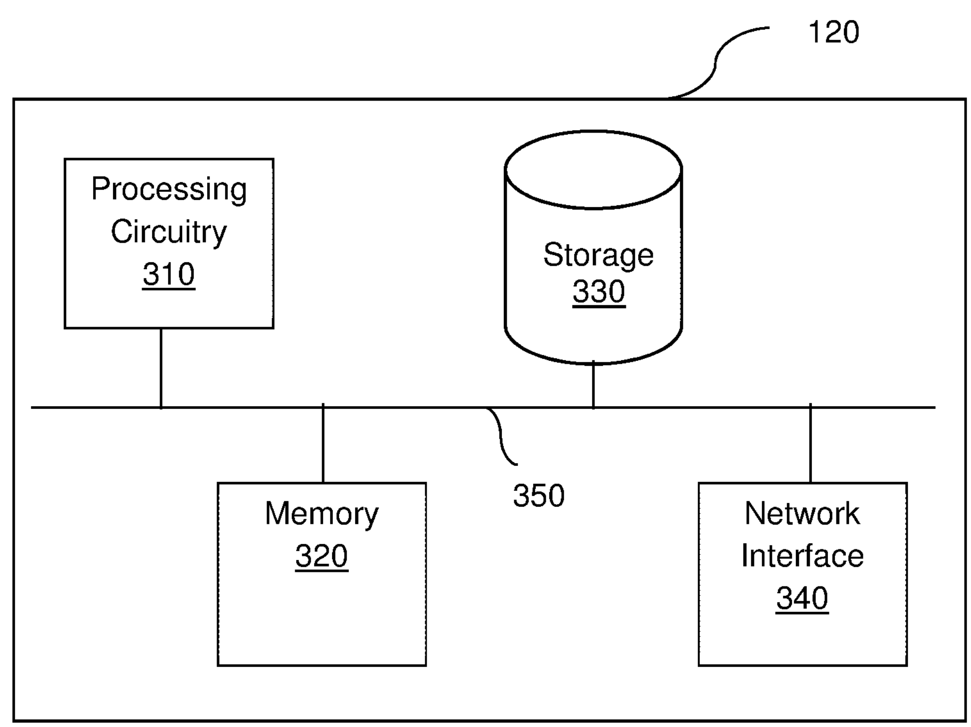
FIG. 3 is a schematic diagram illustrating a threat mitigator according to an embodiment.

FIG. 3 is an example schematic diagram of a threat mitigator 120 according to an embodiment. The threat mitigator 120 includes a processing circuitry 310 coupled to a memory 320, a storage 330, and a network interface 340. In an embodiment, the components of the threat mitigator 120 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein. Specifically, the instructions, when executed, cause the processing circuitry 310 to generate fleet behavior models and detect anomalous behavior in fleets or sub-fleets as described herein.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the threat mitigator 120 to communicate with the database 111 for the purpose of, for example, retrieving assumed behavior data related to the device 130, and the like. Further, the network interface 340 allows the threat mitigator 120 to communicate with the detection tools 112 for the purpose of, for example, retrieving network activity data related to the device 130.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating cyber security threats by devices using risk factors, comprising:

determining a plurality of risk factors for a device based on a plurality of risk behaviors indicated by network activity and information of the device;

determining a risk score for the device based on the plurality of risk factors and a plurality of weights, wherein each of the plurality of weights is applied to one of the plurality of risk factors, wherein the plurality of weights includes at least one negative weight, wherein each negative weight is applied to a corresponding risk factor when the information of the device indicates a mitigating circumstance related to risk posed by the device; and performing at least one mitigation action based on the risk score;

wherein the plurality of risk behaviors includes observed risk behaviors and assumed risk behaviors, wherein the observed risk behaviors are indicated by data related to network activity by the device, wherein the assumed risk behaviors are extrapolated based on known contextual information related to the device.

2. The method of claim 1, wherein the plurality of risk factors is determined for the device when at least one of: the device connects to a network, the device is turned on in physical proximity to a network, and the device becomes physically proximate to network infrastructure.

3. The method of claim 1, wherein the plurality of risk behaviors includes observed risk behaviors, wherein determining the plurality of risk factors further comprises:

determining the observed risk behaviors based on data related to at least one of: configuration of the device, network activity by the device, geographic movement of the device, signal strength of the device, and a protocol used by the device.

4. The method of claim 1, wherein the plurality of risk behaviors includes observed risk behaviors, wherein determining the plurality of risk factors further comprises:

determining the assumed risk behaviors based on at least one of: manufacturer reputation information, device model reputation information, known software vulnerabilities, and known operating system vulnerabilities.

5. The method of claim 1, wherein the at least one mitigation action includes monitoring network activity by the device when the risk score is below a threshold, further comprising:

updating the risk score based on the monitored network activity; and performing at least one subsequent mitigation action based on the updated risk score.

6. The method of claim 1, wherein the plurality of risk factors includes a manufacturer reputation risk factor, wherein the manufacturer reputation risk factor is determined based on the quotient of a number of common vulnerabilities and exposures attributed to a manufacturer of the device over a number of employees of the manufacturer of the device.

7. The method of claim 1, wherein the plurality of risk factors includes a data entropy risk factor, wherein the data entropy risk factor is determined based on entropy of at least one of: data received by the device, and data sent by the device.

8. The method of claim 1, wherein the plurality of risk factors includes at least one of: an attack surface exposure risk factor, a cloud synchronization risk factor, a connection security risk factor, a boundary evasion risk factor, a third party application stores risk factor, a malicious domains risk factor, a vulnerability history risk factor, a data-at-rest risk factor, an external connectivity risk factor, a user authentication risk factor, a software version risk factor, a certificate reuse risk factor, a manufacturer reputation risk factor, and a device model reputation risk factor.

9. The method of claim 1, wherein the plurality of risk factors is determined based further on a plurality of known device behaviors, wherein each of the plurality of known device behaviors is associated with a plurality of known risk factors, wherein each of the plurality of known risk factors is associated with at least one risk behavior.

10. The method of claim 1, wherein the plurality of risk factors is determined based further on a plurality of risk behaviors of at least one other device.

11. A non-transitory computer readable medium having stored thereon instructions for causing a processing circuitry to execute a process, the process comprising:

determining a plurality of risk factors for a device based on a plurality of risk behaviors indicated by network activity and information of the device;

determining a risk score for the device based on the plurality of risk factors and a plurality of weights, wherein each of the plurality of weights is applied to one of the plurality of risk factors, wherein the plurality of weights includes at least one negative weight, wherein each negative weight is applied to a corresponding risk factor when the information of the device indicates a mitigating circumstance related to risk posed by the device; and performing at least one mitigation action based on the risk score;

wherein the plurality of risk behaviors includes observed risk behaviors and assumed risk behaviors, wherein the observed risk behaviors are indicated by data related to network activity by the device, wherein the assumed risk behaviors are extrapolated based on known contextual information related to the device.

12. A system for mitigating cyber security threats by devices using risk factors, comprising:

a processing circuitry; and a memory, the memory containing instructions that, when executed by the processing circuitry, configure the system to:

determine a plurality of risk factors for a device based on a plurality of risk behaviors indicated by network activity and information of the device;

determine a risk score for the device based on the plurality of risk factors and a plurality of weights, wherein each of the plurality of weights is applied to one of the plurality of risk factors, wherein the plurality of weights includes at least one negative weight, wherein each negative weight is applied to a corresponding risk factor when the information of the device indicates a mitigating circumstance related to risk posed by the device; and perform at least one mitigation action based on the risk score;

wherein the plurality of risk behaviors includes observed risk behaviors and assumed risk behaviors, wherein the observed risk behaviors are indicated by data related to network activity by the device, wherein the assumed risk behaviors are extrapolated based on known contextual information related to the device.

13. The system of claim 12, wherein the plurality of risk factors is determined for the device when at least one of: the device connects to a network, the device is turned on in physical proximity to a network, and the device becomes physically proximate to network infrastructure.

14. The system of claim 12, wherein the plurality of risk behaviors includes observed risk behaviors, wherein the system is further configured to:

determine the observed risk behaviors based on data related to at least one of: configuration of the device, network activity by the device, geographic movement of the device, signal strength of the device, and a protocol used by the device.

15. The system of claim 12, wherein the plurality of risk behaviors includes observed risk behaviors, wherein the system is further configured to:

determine the assumed risk behaviors based on at least one of: manufacturer reputation information, device model reputation information, known software vulnerabilities, and known operating system vulnerabilities.

16. The system of claim 12, wherein the at least one mitigation action includes monitoring network activity by the device when the risk score is below a threshold, f wherein the system is further configured to:

update the risk score based on the monitored network activity; and perform at least one subsequent mitigation action based on the updated risk score.

17. The system of claim 12, wherein the plurality of risk factors includes a manufacturer reputation risk factor, wherein the manufacturer reputation risk factor is determined based on the quotient of a number of common vulnerabilities and exposures attributed to a manufacturer of the device over a number of employees of the manufacturer of the device.

18. The system of claim 12, wherein the plurality of risk factors includes a data entropy risk factor, wherein the data entropy risk factor is determined based on entropy of at least one of: data received by the device, and data sent by the device.

19. The system of claim 12, wherein the plurality of risk factors includes at least one of: an attack surface exposure risk factor, a cloud synchronization risk factor, a connection security risk factor, a boundary evasion risk factor, a third party application stores risk factor, a malicious domains risk factor, a vulnerability history risk factor, a data-at-rest risk factor, an external connectivity risk factor, a user authentication risk factor, a software version risk factor, a certificate reuse risk factor, a manufacturer reputation risk factor, and a device model reputation risk factor.

20. The system of claim 12, wherein the plurality of risk factors is determined based further on a plurality of known device behaviors, wherein each of the plurality of known device behaviors is associated with a plurality of known risk factors, wherein each of the plurality of known risk factors is associated with at least one risk behavior.

21. The system of claim 12, wherein the plurality of risk factors is determined based further on a plurality of risk behaviors of at least one other device.

* * * * *